J. T. GILMER.
DOWEL PIN.
APPLICATION FILED APR. 16, 1919.
1,354,549.
Patented Oct. 5, 1920.
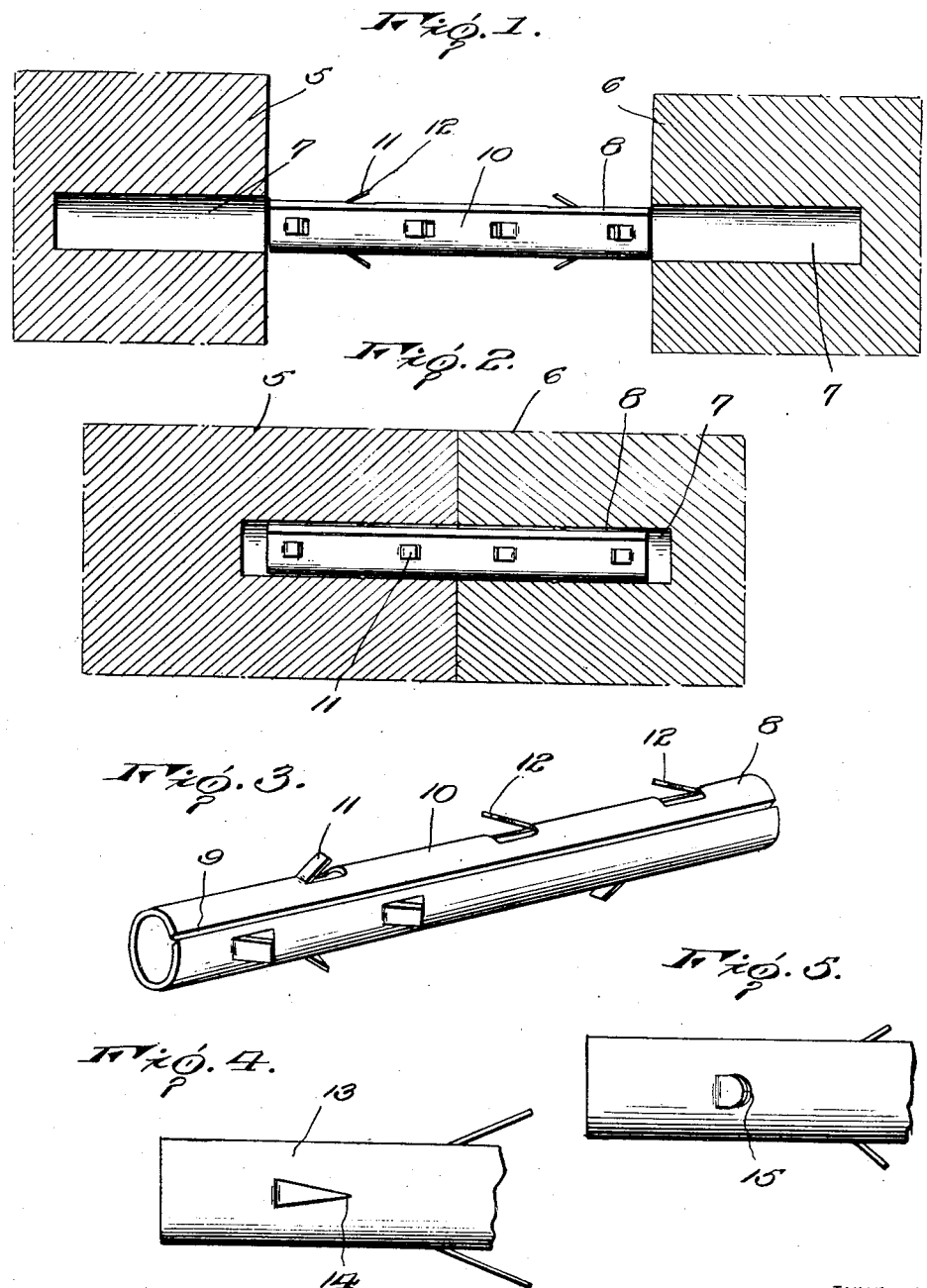

UNITED STATES PATENT OFFICE.

JOHN T. GILMER, OF FULTON, ALABAMA.

DOWEL-PIN.

1,354,549.  Specification of Letters Patent.  Patented Oct. 5, 1920.

Application filed April 16, 1919. Serial No. 290,471.

*To all whom it may concern:*

Be it known that I, JOHN T. GILMER, a citizen of the United States, residing at Fulton, in the county of Clarke and State of Alabama, have invented certain new and useful Improvements in Dowel-Pins, of which the following is a specification.

This invention relates to dowel pins and has for its object the provision of a comparatively simple and thoroughly efficient device of this character by means of which adjoining sections of wood may be firmly united without the application of glue or other adhesive thereto and without the employment of wedges or expanders for retaining the pin to its seat in said sections.

The invention further aims to provide a dowel pin including a tubular member having a plurality of resilient locking tongues struck out from the body thereof and adapted to bear against and frictionally engage the wall of the pin seat whereby to securely hold the pin in its seat and prevent accidental displacement thereof under all climatic conditions.

The invention further contemplates the provision of a tubular dowel pin the central portion of which is smooth and unobstructed, and the opposite end thereof provided with resilient tongues disposed in staggered relation with their terminals inclined in the direction of the smooth central portion so as to permit ready insertion of the pin into its seat but lock said pin against withdrawal.

A further object of the invention is to provide a dowel pin the construction of which is such that should shrinkage occur in the joined sections the gap between said sections may be readily closed by merely pressing the sections together.

A still further object of the invention is generally to improve this class of devices so as to increase their utility, durability and efficiency.

In the drawings:

Figure 1 is a side elevation of a dowel pin constructed in accordance with the present invention showing the pin in position to unite adjoining sections of wood;

Fig. 2 is a top plan view partly in section showing the dowel pin fitted to its seat and holding the sections firmly united;

Fig. 3 is a perspective view of the dowel pin detached;

Fig. 4 is a top plan view illustrating a modified form of the invention;

Fig. 5 is a similar view illustrating a further modification.

Corresponding and like parts are referred to in the following description and indicated in all the views of the drawings by the same reference characters.

The improved dowel pin forming the subject matter of the present invention may be employed for joining or uniting various kinds of woodwork and by way of illustration is shown connecting adjoining sections 5 and 6 having seats or passages 7 formed in the abutting faces thereof and adapted to register with each other when said sections are united.

The device comprises a tubular member 8 preferably stamped or otherwise formed from a single sheet of resilient metal bent into substantially cylindrical shape with the adjacent longitudinal edges 9 thereof slightly spaced apart to give the desired resiliency to said member. The central portion or zone 10 of the tubular member 8 is smooth and unobstructed while the walls of said member on opposite sides of the smooth portion 10 are stamped or otherwise bent laterally to form outstruck resilient locking tongues 11, the terminals of which are spaced from the exterior wall of the member 8 and are inclined in the direction of the central portion 10 of said member so as to permit the dowel pin to be readily inserted within the passage or seat 7. The locking tongues 11 will preferably possess sufficient resiliency to frictionally engage the walls of the passage or seat 7 when the pin is driven therein and thereby cause said tongues to grip the walls of the seat 7 and hold the sections 5 and 6 firmly united without the employment of glue or other adhesive material. The resilient locking tongues 11 are preferably substantially rectangular in shape as shown with their free ends flat or square so as to produce sharp edges or corners 12 which tend to bite into the walls of the passage 7 and further assist in preventing accidental withdrawal of the dowel pin from its seat. As clearly shown in Figs. 2 and 3 of the drawings the locking tongues 11 are arranged in staggered relation so as to increase the holding efficiency of the pin without liability of weakening the metal out of which they are struck. By arranging the resilient locking tongues in this manner a three point contact is produced at spaced intervals around the circumference of the pin so as to increase the holding power of said pin.

The diameter of the passage 7 is preferably slightly greater than the diameter of the tubular member 8 while the length of the passage 7 is preferably slightly longer than the length of said tubular member so that should shrinkage occur in the wood of which the sections 5 and 6 are formed the gap between said sections due to the shrinkage of the wood may readily be closed by merely exerting an inward pressure on the sections thereby to cause the faces thereof to contact.

In using the dowel pin one end thereof is inserted in the passage 7 in one of the sections and driven home with a hammer or other suitable tool leaving the smooth unobstructed portion 10 of the tubular member exposed at the outer face of said section, after which the opposite end of the tubular member is inserted in the passage of the mating section and the two sections forcibly pressed together until the confronting faces of said sections contact. As the tubular member is driven to its seat the resilient locking tongues 11 will be depressed or partially depressed and owing to the resiliency of said tongues the sharp edges or corners 12 thereof will effectually bite into and grip the walls of the passage or seat 7 and lock the pin against accidental withdrawal. It will be obvious that any strain exerted on the pin tending to separate the sections 5 and 6 will cause the tongues 11 to more firmly grip or bite into the walls of the seat 7, this being due to the angle or inclination of the tongues with respect to the body of the pin.

If desired, the body of the pin instead of being longitudinally split may be in the form of a continuous cylindrical body as indicated at 13 in Fig. 4 of the drawings and the ends of the locking tongues instead of being flat or square may be provided with pointed terminals 14 as indicated in said figure.

A further modification is illustrated in Fig. 5 of the drawings in which the terminals of the tongues are provided with curved or rounded edges 15. In all forms of the device, however, the locking tongues will be resilient and inclined in opposite directions toward the center of the tubular member so as to lock the pin within its seat when said pin is driven home.

It will, of course, be understood that the dowel pins may be made in different sizes and shapes according to the purpose for which they are to be used.

Having thus described the invention, what is claimed as new is:

1. A dowel pin including a tubular member having its opposite ends provided with outstruck resilient locking tongues disposed in staggered relation with respect to each other, the free ends and side walls of said tongues being normally spaced from the exterior wall of the member and extending in the direction of the central portion of said tubular member.

2. A dowel pin including a tubular member having its central portion smooth and unobstructed and its walls on opposite sides of said smooth portion provided with outstruck resilient tongues, the side and end walls of the tongues at the free ends thereof being normally spaced from the exterior wall of the said member and extending toward the smooth central portion thereof.

3. A dowel pin including a longitudinally split tubular member, and a plurality of resilient locking tongues extending laterally from the exterior walls thereof in opposite directions toward the center of said member, with the side and end walls of the tongues at the free ends thereof normally separated from the body of said tubular member.

4. A dowel pin including an open-ended tubular member having its side walls provided with outstruck resilient locking tongues extending in opposite directions toward the center of said tubular member, the side and end walls of the locking tongues being normally separated from the outer face of the tubular member and the free ends of said locking tongues being provided with sharp terminal edges.

5. A dowel pin formed of a single sheet of resilient material rolled into substantially cylindrical form to produce an open-ended tubular member, the side walls of the tubular member on opposite sides of the center thereof being provided with incisions and the metal at said incisions being pressed outwardly to form locking tongues extending in opposite directions toward the central portion of the tubular member, the side and end walls of the tongues being normally separated from the exterior wall of the tubular member and the free ends of said tongues being adapted to frictionally engage the walls of a seat in which the dowel pin is inserted.

6. The combination with adjoining sections having alined seats formed therein, of a dowel pin including a tubular body portion having its walls formed with outstruck resilient tongues extending in opposite directions toward the center of said body portion, the side and end walls of the tongues being normally separated from the exterior wall of the pin and the free ends of the tongues being adapted to be compressed and frictionally engage the walls of the seats when the dowel pin is fitted therein.

7. The combination with adjoining sections having alined seats formed therein, of a dowel pin fitting within said seats and including a resilient tubular member having a smooth exterior portion disposed at the junction of said sections and its walls formed with outstruck resilient locking tongues extending in opposite directions toward said smooth portion, the side and end walls of the tongues being normally separated from the exterior wall of the tubular member and the free ends of said tongues being adapted to frictionally engage the walls of the seats in the sections when the tubular member is fitted therein.

In testimony whereof I affix my signature.

JOHN T. GILMER. [L. S.]